Jan. 18, 1955
E. H. STEIN
2,699,668
STRUCTURAL ASSEMBLY OF GLASS PLATES
Filed July 30, 1948
3 Sheets-Sheet 1
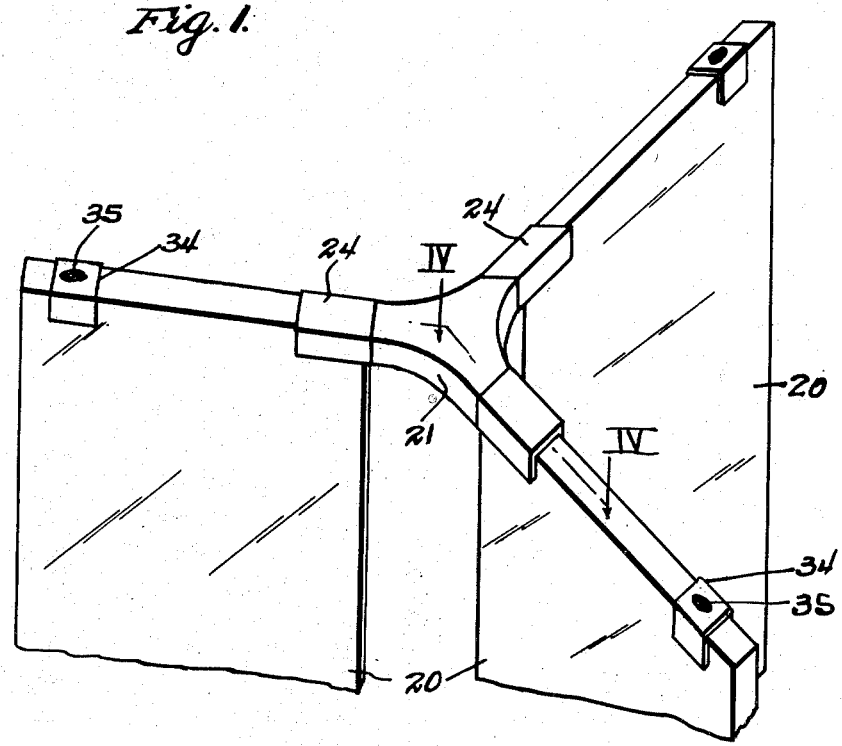
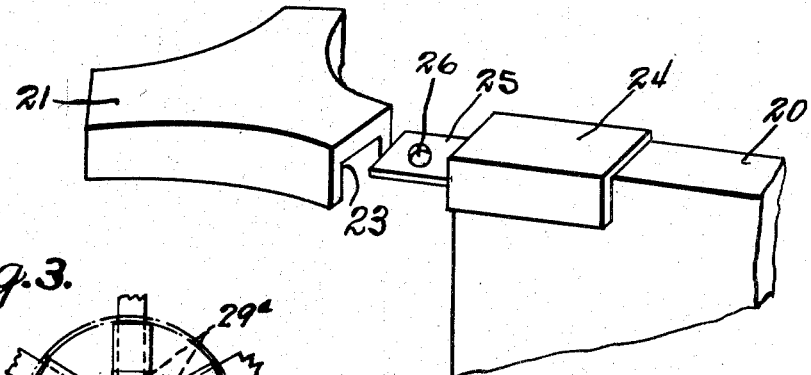
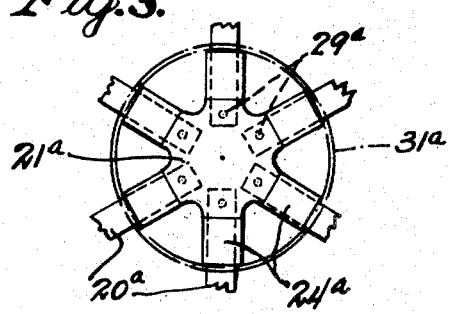
INVENTOR
EDWARD H. STEIN
BY Olen E. Bee
ATTORNEY.

Jan. 18, 1955　　　　E. H. STEIN　　　　2,699,668
STRUCTURAL ASSEMBLY OF GLASS PLATES
Filed July 30, 1948　　　　　　　　　　3 Sheets-Sheet 2
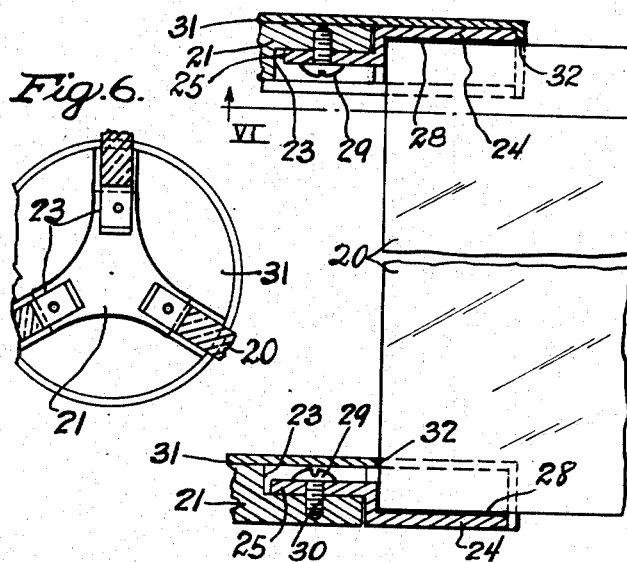
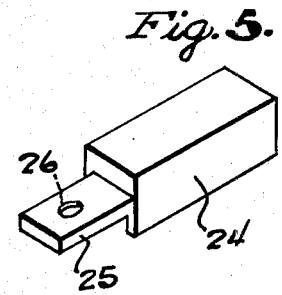
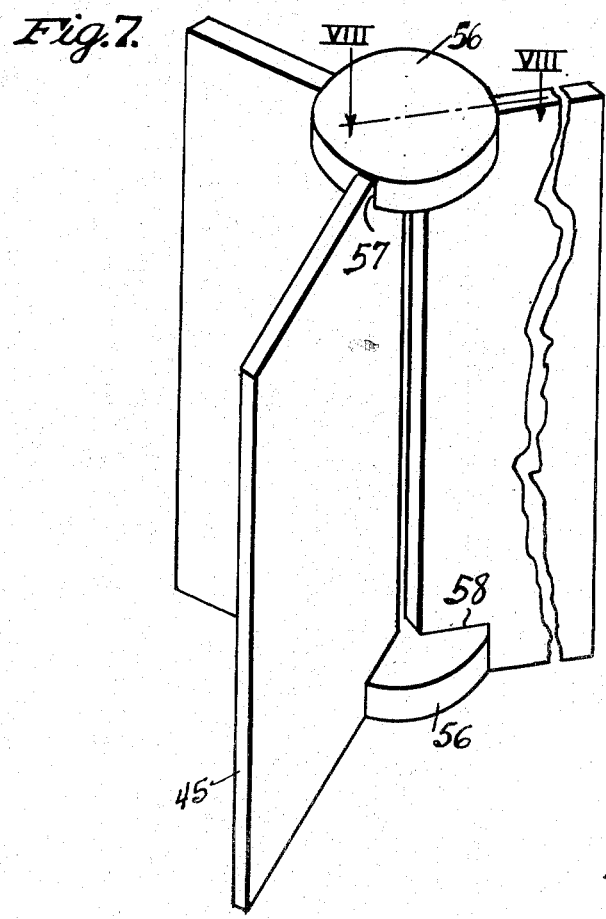
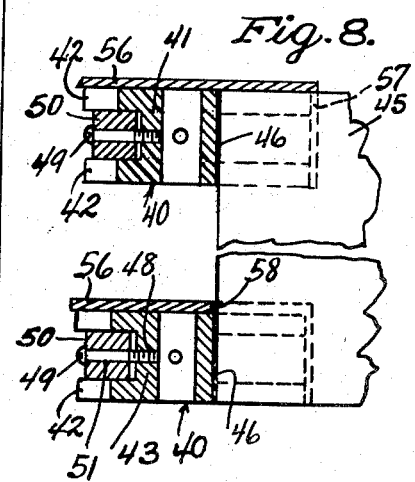
INVENTOR
EDWARD H. STEIN
BY Olen E. Bee
ATTORNEY.

Jan. 18, 1955  E. H. STEIN  2,699,668
STRUCTURAL ASSEMBLY OF GLASS PLATES
Filed July 30, 1948  3 Sheets-Sheet 3
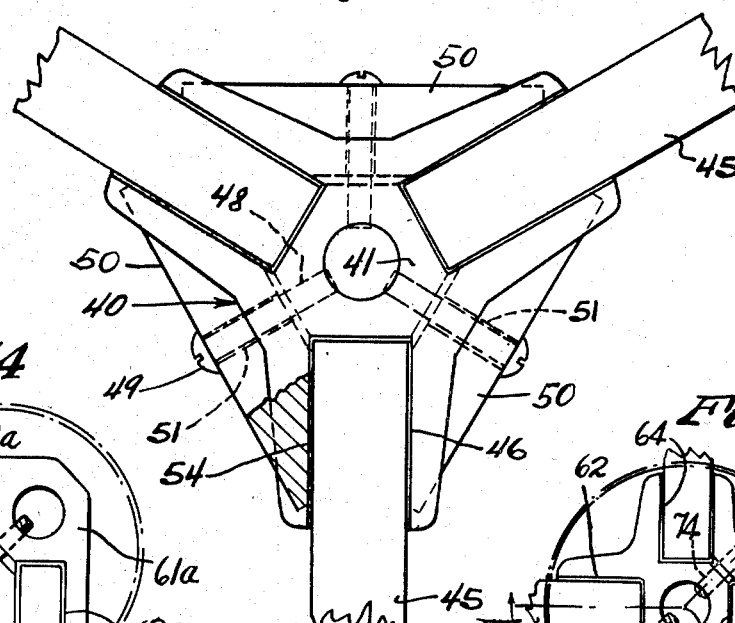
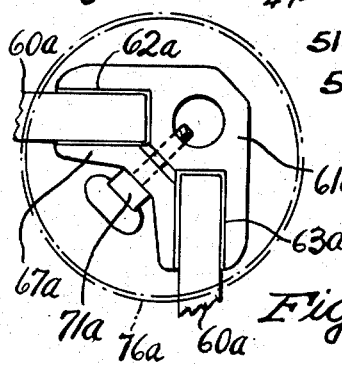
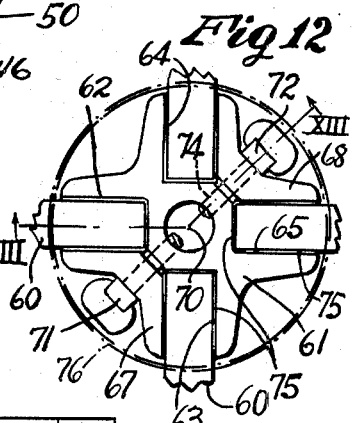
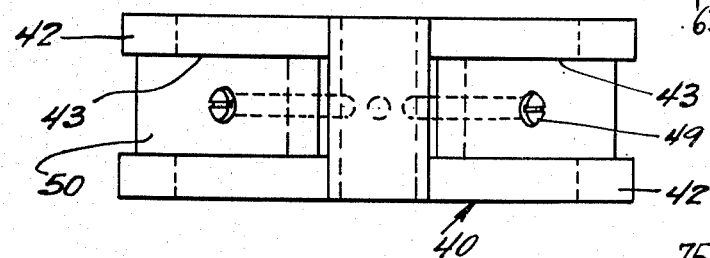
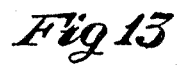
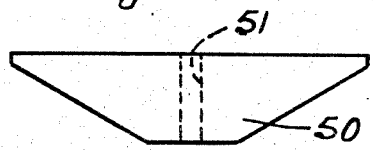
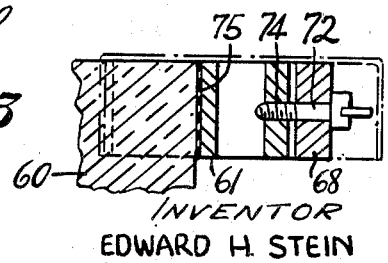
INVENTOR
EDWARD H. STEIN
BY Olen E. Bee
ATTORNEY.

United States Patent Office 2,699,668
Patented Jan. 18, 1955

2,699,668

STRUCTURAL ASSEMBLY OF GLASS PLATES

Edward H. Stein, Pittsburgh, Pa., assignor to Pittsburgh Plate Glass Company, Pittsburgh, Pa., a corporation Application July 30, 1948, Serial No. 41,522

2 Claims. (Cl. 72—0.5)

This invention relates to structural glass units and it has particular relation to assemblies of glass plates including devices for securing glass plates in assembled relation.

One object of the invention is to provide an improved structural assembly of glass plates and bracket fittings for holding the glass in proper position.

Another object of the invention is to provide an improved glass assembling structure by the use of which glass plates, such as those used in making furniture, can be shipped substantially as flat glass to facilitate the packing and transportation of structural units, and whereby such glass can be assembled in furniture form without difficulty at the location of sale to consumers.

In manufacturing glass furniture in which glass plates serve as supports as well as ornamental features, it has been found that shipping and mounting of structural elements of the glass unit present problems not encountered in the manufacture and shipment of ordinary furniture. Glass, of course, must be handled with care and if the parts were assembled as units of furniture before shipment, it would be necessary to resort to elaborate packing to prevent breakage. Other problems, such as skill in assembling the structural units also must be taken into consideration.

According to the invention disclosed herein, it is proposed to produce elements which are so simple in arrangement and so easy to assemble that the glass and other parts can be shipped separately and assembled very easily at the points of sale to consumers. In one of its simplest forms, upright plates of glass are provided with bracket fittings which receive edge portions of the glass and by the use of pre-formed fittings, the entire structure can be assembled by ordinary unskilled labor. Three or more glass plates are disposed in upright positions with vertical edges thereof at a central area from which the plates radiate from the mounting brackets or fittings. Glass tops can be positioned horizontally upon the plates and, if desired, the tops can be anchored upon the upper edges of the glass. Transparent cement can be employed to secure the tops in place or, under certain conditions, the area and weight of the top are such that the top will remain in place without using fastening elements.

In the drawing:

Fig. 1 is a fragmentary perspective of structural glass plates secured together by means of bracket fittings; Fig. 2 is a fragmentary perspective illustrating, in disassembled relation, portions of the structure shown in Fig. 1; Fig. 3 is a fragmentary plan of another form of glass and fitting structure; Fig. 4 is a fragmentary vertical section taken substantially along the line IV—IV of Fig. 1, but with fairings and the lower portion of the structure included; Fig. 5 is a perspective of a channel fitting employed in assembling glass plates; Fig. 6 is a horizontal section taken substantially along the line VI—VI of Fig. 4; Fig. 7 is a perspective of another form of unit employing glass plates; Fig. 8 is a fragmentary vertical section taken substantially along the line VIII—VIII of Fig. 7; Fig. 9 is a fragmentary plan, on a larger scale, of a central portion of the structure shown in Fig. 7 and with the fairing omitted; Fig. 10 is a side elevation of one of the fittings shown in Fig. 9; Fig. 11 is a side elevation of a clamp fitting included in the fitting shown in Fig. 10; Fig. 12 is a fragmentary plan of another arrangement of glass plates and assembling fittings therefor; Fig. 13 is a fragmentary cross-section taken substantially along the line XIII—XIII of Fig. 12; and Fig. 14 is a plan of still another arrangement of glass plates and assembling fittings therefor.

Referring to Figs. 1, 2, 4 and 6, a plurality of glass plates 20, which may be ¼" to 1" in thickness, are arranged radially in an upright position so that each plate presents a vertical wall. Central upper and lower bracket fittings 21 from which the plates radiate are formed with outwardly opening recesses 23, which are in the form of relatively shallow channels. Upper and lower corner portions of each glass plate are provided with channel fittings 24 of thin metal including outwardly extending substantially horizontal tongues 25 which are offset slightly from the body of the channel fitting in each instance. An opening 26 is formed centrally of each tongue.

The channel fittings 24 are mounted upon the upper and lower corners of the glass plates by means of cement 28 which is strongly adherent to both glass and metal. Suitable cements for securing glass plates on metal fixtures of the type shown and described herein, are disclosed in U. S. Patent No. 2,316,528, dated April 15, 1943.

Since the channel fittings 24 do not materially alter the flat character of the glass plate, the fittings can be applied to the glass before shipment and the assembly can be packed according to ordinary practice employed in packing and shipping flat glass. In assembling the glass with the central bracket fittings 21, the tongues 25 are inserted in the channels 23, and bolts or screws 29 disposed through the openings 26 are screwed into the brackets as indicated at 30. The channels 23 of the bracket fittings radiate horizontally at regular intervals and after the fasteners 29 have been secured in place, the unit is firmly braced to constitute a rigid frame which is capable of supporting various types of tops or other forms of structure which it may be desirable to support.

If desired, the fittings 21 and 24 can be covered by a fairing or cup 31 of thin metal which is provided along its outer marginal portions with radially disposed notches 32, fitting about marginal portions of the glass adjacent the outer edges of the fittings 24. The outer bottom surface of the cup-shaped fairing faces upwardly, that is, the rim portions extend downwardly so as to present an upper side of a disc like covering for the fittings. This fairing can be in the form of decorative metal such as brass, chromium or aluminum.

It is to be noted that the notches 32 are deeper on the lower fairings so as to accommodate the marginal portions of the glass which extend therethrough. It is to be understood that small saddle clips 34 of resilient metal can be sprung over the upper edges of the glass plates at convenient locations and they can be provided with rubber cushions 35 to receive a top. The upper supporting portions of the structure are thus properly leveled for receiving whatever type of top it is desirable to install thereon.

In the arrangement shown in Fig. 3, glass plates 20a are mounted at their edges in a central fitting 21a in substantially the same relation as the plates 20 are received in the fitting 21, but it is to be noted that materially more glass plates can be employed with the fitting 21a. Channel fittings 24a and fasteners 29a are constructed and mounted in substantially the same manner as that shown and described with reference to the channel fittings 24 and fasteners 29. Likewise, a cup-shaped fairing 31a, shown for convenience in broken lines, is applicable to the structure illustrated in Fig. 3, and is mounted in substantially the same manner as the fairing 31.

Referring to Figs. 7 to 11, upper and lower central master bracket fittings 40 are provided with hubs 41 of polygonal form, from which spaced arms 42 radiate integrally and substantially horizontally. Pairs of these arms are spaced vertically and adjacent pairs of vertically spaced arms define recesses 43 for receiving marginal portions of upright glass plates 45. Suitable cement 46 of the type disclosed in Patent No. 2,316,528, referred to above, facilitates the mounting of the plates in the fittings. Tapped openings 48 formed radially and substantially horizontally in the hub 41 of each master fitting 40, receive fasteners 49, such as bolts or screws, which are designed to draw inwardly several clamps 50 whose surfaces are bevelled and converge so as to have flat bearing against the marginal portions of the glass from opposite sides. The fasteners 49 fit slidably through openings 51 formed centrally in the clamps 50. When the clamps are set in place with portions thereof fitting slidably between upper and lower arms 42, as shown in Figs. 9 and 10, the openings 51 register with respective tapped openings 48 so that, by tightening the fasteners, the faces of the clamps bear uniformly in wedging relation to the sides of the glass plates along the marginal portions thereof. In order to cushion the glass plates against direct contact with the metal clamps 50, gaskets 54 composed of adhesive rubber compound are disposed between opposite faces of the glass and clamps. From this description, it will be apparent that the setting of the glass plates in proper position is greatly facilitated by the use of the master bracket fittings and that the clamps are easily mounted in cooperation with the bracket fittings to insure strong and uniform bracing of the several elements in the entire assembly. Either clear glass or opaque glass can be employed as structural elements of the type described above.

Cup shaped fairings 56 of thin metal are applicable to fit over the edges of the glass plates and to cover the fittings in the same manner as the fairings 31 are applied to the construction previously described with reference to Figs. 4 and 6. The fairings 56 are notched, as indicated at 57 and 58, to receive edge portions of the glass plates and to insure snug engagement of the fairings with the fittings.

In the form of structure shown in Figs. 12 and 13, four glass plates 60 can be held in upright position by means of a master fitting 61 which is provided with two pairs of upright walls 62—63 and 64—65, against which one side of each glass plate adjacent an edge thereof is adapted to be clamped. These pairs of clamping walls are so arranged that only two clamps 67 and 68 are required to secure the four glass plates which radiate edgewise from a central upright axis 70 of the fitting.

As viewed in Fig. 12 two of the walls 63—64 are disposed substantially diametrically opposite each other and face in a clockwise direction, while the other two upright clamping walls 62—65, also are disposed substantially diametrically opposite each other and face in a counter-clockwise direction with respect to the axis 70. The two clamps 67 and 68 are disposed in slidable relation upon diametrically opposite and radially arranged wing bolts 71 and 72, respectively, thereby presenting clamping walls parallel to the respective upright walls of the fitting. When the bolts 71 and 72 are tightened in tapped openings 74 formed in the fitting, opposite or converging clamping faces of the clamp 67 are disposed substantially parallel to the respective faces 62 and 63 of the fitting, and in opposed relation thereto. Likewise, the opposite or converging faces of the clamp 68 are disposed in opposed parallel relation to the walls 64 and 65 of the fitting. Suitable gaskets 75 of adhesive rubber serve to cushion marginal portions of glass plates under the clamping action applied thereto. The diametrically opposed tapped openings 74 receive the wing bolts in screw threaded relation to insure proper tightening of the clamps against the marginal portions of the glass plates.

A cup shaped fairing 76 of thin metal shown in broken lines is applicable to the construction described in the same manner as the fairings 31 and 56 are applied in the construction previously described with reference to Figs. 4 and 8.

Referring to Fig. 14 a single corner construction can be formed by omitting one of the clamps of the type described with reference to Figs. 12 and 13, and also by omitting one pair of upright clamping walls of the fitting shown in the latter figures. In Fig. 14, two glass plates 60a are incorporated with a fitting 61a which is formed with clamping walls 62a and 63a corresponding substantially to the clamping walls 62 and 63, respectively, of Fig. 12. A clamp 67a is slidable upon a wing bolt 71a to clamp the glass plates 60a in substantially the same manner as the clamp 67 functions. Likewise, a cup shaped fairing 76a is arranged upon the fitting similarly to the arrangement of the fairings 31 and 76 described with reference to other figures of the drawing.

Although more than one form of the invention has been shown and described in detail, it will be apparent to those skilled in the art that the invention is not so limited but that various changes can be made therein without departing from the spirit of the invention or the scope thereof as defined by the appended claims.

I claim:
1. In a structural assembly including a plurality of upright glass plates at least three of which radiate in upright planes angularly with respect to one another, said plates constituting the supporting structure of the assembly and normally resting on their lower edges for support, saddle fitting means rigidly and permanently secured upon a first side edge portion of each of said glass plates, a tongue extension of the saddle fitting means extending outwardly of the first side edge, a central bracket structure adapted for connection to each of said saddle fitting means, said bracket structure having recesses disposed radially for interfitting the tongue extension of the saddle fitting means thereto to facilitate attachment between the bracket structure and the saddle fitting means, clamping means securing the bracket structure and the tongue extension in a substantially rigid assembly, the side edge portion of each glass plate provided with said saddle fitting means thus becoming the radially inner edge of each upright glass plate, the other side edge of each of said upright glass plates being unsupported.

2. The structure recited in claim 1, wherein the radially disposed recesses of the bracket structure are spaced at equal angles about the bracket.

References Cited in the file of this patent

UNITED STATES PATENTS

| Number | Name | Date |
|---|---|---|
| 534,788 | Erkenswick | Feb. 26, 1895 |
| 578,728 | Doten | Mar. 16, 1897 |
| 682,621 | Humphery | Sept. 17, 1901 |
| 722,588 | Kade | Mar. 10, 1903 |
| 790,132 | Jaeger | May 16, 1905 |
| 959,940 | Hunter | May 31, 1910 |
| 1,031,364 | Newpher | July 2, 1912 |
| 1,048,566 | Miller | Dec. 31, 1912 |
| 1,215,882 | Simonds et al. | Feb. 13, 1917 |
| 1,551,462 | Broome | Aug. 25, 1925 |
| 1,818,404 | Kaufman | Aug. 11, 1931 |
| 1,863,381 | Orthwine | June 14, 1932 |
| 2,371,493 | Aschinger | Mar. 13, 1945 |

FOREIGN PATENTS

| Number | Country | Date |
|---|---|---|
| 37,731 | France | of 1930 |
|  | (Addition to No. 651,500) |  |
| 750,919 | France | of 1933 |
| 459,428 | Great Britain | of 1937 |